H. C. HOTING.
FLUID CONVEYING SWINGING JOINT.
APPLICATION FILED OCT. 25, 1918.
1,324,967.
Patented Dec. 16, 1919.
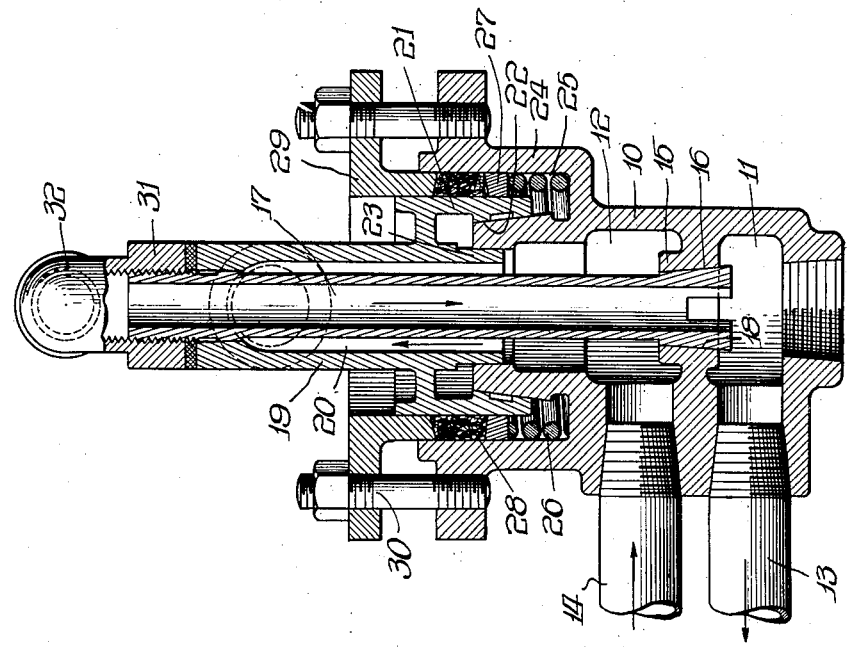
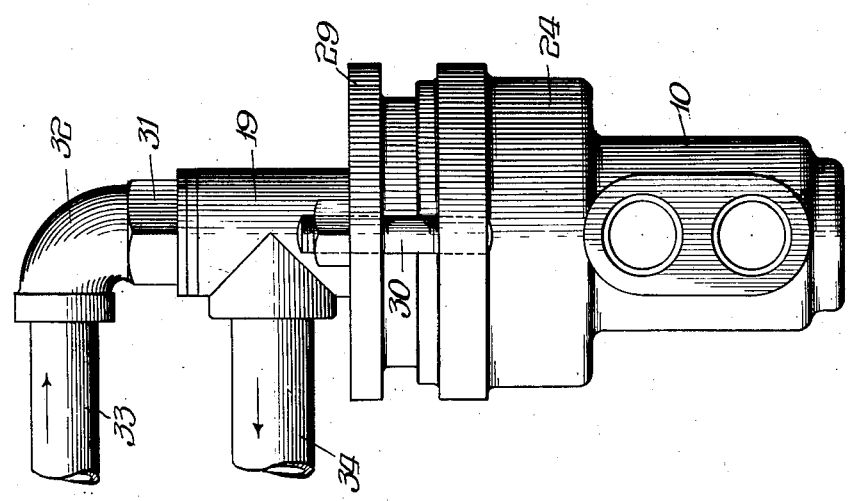
Witnesses:
R. Burkhardt
Chas. L. Byron
Inventor:
Hans C. Hoting
By Wilkinson & Huxley
Attys

UNITED STATES PATENT OFFICE.

HANS C. HOTING, OF CHICAGO, ILLINOIS, ASSIGNOR TO TROY LAUNDRY MACHINERY CO. LTD., OF CHICAGO, ILLINOIS, A CORPORATION OF NEW YORK.

FLUID-CONVEYING SWINGING JOINT.

1,324,967. Specification of Letters Patent. Patented Dec. 16, 1919.

Application filed October 25, 1918. Serial No. 259,628.

*To all whom it may concern:*

Be it known that I, HANS C. HOTING, a citizen of the United States, residing at Chicago, in the county of Cook and State of Illinois, have invented certain new and useful Improvements in Fluid-Conveying Swinging Joints, of which the following is a specification.

This invention relates to fluid conveying swinging joints.

One object of this invention is to simplify and improve in a novel manner fluid, and more particularly steam, connections, wherein the parts are relatively movable and whereby no steam may escape regardless of the relative movements of said parts.

Another object is to provide a practical steam conveying swinging joint adapted to meet the various requirements for successful use.

These and other objects are accomplished by means of the arrangement disclosed on the accompanying sheet of drawings, in which—

Figure 1 is a vertical sectional view of my improved fluid conveying swinging joint; and, Fig. 2 is a side elevation of the swinging joint taken at right angles to the position shown in Fig. 1.

This swinging joint includes a casing member 10 having a plurality of fluid conveying passageways 11 and 12, to which fluid conveying pipes 13 and 14, respectively, are connected. Intermediate the passageways 11 and 12 in the joint member 10 is an annular integrally-formed shoulder 15 having an internally arranged conical seat 16. A fluid conveying member 17 having a passageway communicating with the passageway 11 in the casing 10 is provided at one end with an external conical portion 18 forming a movable joint with the conical seat 16. Surrounding the upper portion of the conveying member 17 is another fluid conveying member 19 having a passageway 20 communicating with the passageway 12 in the casing 10, and having an annular flange 21 with an internally-arranged conical portion for the reception of an externally-arranged conical seat 22 formed integrally with the upper part of the casing 10, thereby forming a movable joint between the parts in question. Formed integrally with the member 19 is an annular collar 23 arranged within the flange 21 and with said flange forming an annular channel for the reception of the member having the conical seat 22. Formed integrally with the casing 10 at the upper end thereof is an annular flange 24, which, with the conical seat member 22, forms an annular channel 25 for the reception of a coiled spring 26 which presses upwardly against a washer 27, which in turn presses against packing 28, the latter being pressed downwardly by a cap 29, a portion of which is interposed between the casing flange 24 and the upper portion of flange 21. This cap 29 is secured to the casing 10 by a bolt and nut arrangement 30. The inner surface of the collar 29 also has a swinging engagement with the outer surface of the flange 21. To draw the conical portion 18 into proper relationship with its conical seat 16, and likewise to force the coöperating conical portions 21 and 22 into intimate relationship, a nut 31 having a pipe connection 32 is secured onto the upper threaded portion of the fluid conveying member 17. It is apparent, therefore, that the tightness of the joint portions is controlled by the coöperative action of the nut 31 and members 17 and 19.

This fluid conveying swinging joint can be used in many places, including pressing machines, the use for which it was particularly designed. When used for such purpose steam is conveyed through the joint by entering through a pipe 33 connected to the nut 32 and passes down through the member 17 into the casing passageway 11, out through pipe 13 to a part of the pressing machine, such as the pressing shoe (not shown), the steam returning through pipe 14, passageway 12 in casing 10 up through passageway 20 of member 19 and out through pipe 34 connected to the member 19. By means of this joint the relatively moving parts may move with respect to each other without a leakage of any steam, such, for example, as from passageway 11 directly into passageway 12, or from passageway 12 out around through channel 25. This simple and compact fluid conveying joint has its parts arranged in a manner to meet all the requirements for successful commercial use.

It is my intention to cover all modifications falling within the spirit and scope of the following claims.

I claim:—

1. A fluid conveying swinging joint comprising a joint member having a plurality of fluid passageways and a plurality of conical seats, a steam conveying member communicating with one of said passageways and having a conical portion forming a movable joint with one of said conical seats, and another fluid conveying member concentric with respect to the other and communicating with another of said passageways and having a conical portion forming a movable joint with another one of said conical seats.

2. A fluid conveying swinging joint comprising a joint member having a plurality of fluid passageways and a plurality of conical seats, and a plurality of steam conveying members one arranged within the other and communicating with said passageways and having conical portions forming movable joints with said conical seats.

3. A fluid conveying swinging joint comprising a joint member having a plurality of fluid passageways and a plurality of joint surfaces, and a plurality of concentrically arranged steam conveying members communicating with said passageways and having joint surfaces forming movable joint portions with said other joint surfaces.

4. A fluid conveying swinging joint comprising a casing having a plurality of passageways, a shoulder portion within said casing having a seat, a fluid conveying member mounted within said casing having a passageway communicating with one of the casing passageways and having a portion for coöperating with said seat to form a movable joint therewith, and another fluid conveying member surrounding the former and having a passageway communicating with the other casing passageway and forming a movable joint with said casing.

5. A fluid conveying swinging joint comprising a casing having a plurality of passageways, a shoulder portion within said casing having a seat, a fluid conveying member mounted within said casing having a passageway communicating with one of the casing passageways and having a portion for coöperating with said seat to form a movable joint therewith, another fluid conveying member having a passageway communicating with the other casing passageway and forming a movable joint with said casing, and means for relatively adjusting said fluid conveying members for regulating the snugness with which the coöperating joint surfaces engage each other.

6. A fluid conveying swinging joint comprising a joint member having a plurality of fluid passageways and a plurality of conical seats, a plurality of steam conveying members communicating with said passageways and having conical portions forming movable joints with said conical seats, and means for relatively adjusting said steam conveying members for regulating the degree of snugness with which the joint members engage each other.

7. A fluid conveying swinging joint comprising a member having a plurality of passageways and having formed thereon joint surfaces, one part of said member having a channel portion, a fluid conveying member communicating with one of said passageways and having a joint surface engaging one of said other joint surfaces, another fluid conveying member having a passageway communicating with another one of said passageways and having a joint surface engaging another one of said joint surfaces, packing between said first and last mentioned members, and a spring mounted in said channel portion for retaining the packing in place.

Signed at Chicago, Illinois, this 21 day of October, 1918.

HANS C. HOTING.